US005748319A

United States Patent [19]
Baek et al.

[11] Patent Number: 5,748,319
[45] Date of Patent: May 5, 1998

[54] METHOD FOR SENSING COMPLETE REMOVAL OF OXIDE LAYER FROM SUBSTRATE BY THERMAL ETCHING WITH REAL TIME

[75] Inventors: Jong-Hyeob Baek; Bun Lee; Sung-Woo Choi, all of Daejeon; Jin-Hong Lee, Seoul, all of Rep. of Korea

[73] Assignee: Electronics and Telecommunications Research Institute, Daejeon, Rep. of Korea

[21] Appl. No.: 671,842

[22] Filed: Jun. 28, 1996

[30] Foreign Application Priority Data

Dec. 20, 1995 [KR] Rep. of Korea ............... 1995-52675

[51] Int. Cl.$^6$ .................................. G01B 11/06
[52] U.S. Cl. .......................... 356/382; 250/559.28
[58] Field of Search ........................ 356/355, 381, 356/382, 72; 250/559.27, 559.28

[56] References Cited

U.S. PATENT DOCUMENTS

| 4,717,446 | 1/1988 | Nagy et al. ............... 156/626.1 |
| 4,953,982 | 9/1990 | Ebbing et al. ............... 356/355 |

OTHER PUBLICATIONS

"In–situ optical monitoring of OMVPE deposition of AlGaAs by laser reflectance", H. Sankur, W. Southwell and R. Hall, J. Electronic Materials, vol. 20, No. 12, 1099 (1991).

"Complex refractive indices of AlGaAs at high temperature measured by in–situ reflectometry during growth by meta-lorganic chemical vapor deposition", Hiroji Kawai, Shunji Imanaga, Kunio Kaneko, and Naozo Watanabe, J. Appl. Phys. vol. 61, No. 1,328 (1987).

"Crystallographic defects in (001) GaAs epitaxial layers grown by MOCVD", J. van de Ven, J.L. Weyher, H. Ikink, and L.J. Giling, J. Electrochem, Soc. vol. 134, No. 4, 989 (1987).

"Morphology and defect study in low pressure MOCVD grown AlGaAs", L.P. Chen, C.Y. Chang and T.S. Wu, Solid–State Electronics vol. 30. No. 2, 189(1987).

"Two Selective etching solutions for GaAs on InGaAs and GaAs/AlGaAs on InGaAs", D.G. Hill, K.L. Lear, and J.S. Harris, Jr., J.Electrochem, Soc. vol. 137, No. 9,2912(1990).

"Substrate orientation and processing effects on GaAs/Si misorientation in GaAs–on–Si grown by MBE" R.J. Matyi, J.W. Lee and H.F. Schaake, J. Electronic Materials, vol. 17, No. 1,87(1988).

"Materials aspects of GaAs and InP based structure", V. Swaminathan and A.T. Macrander, (Prentice–Hall, Englewood Cliffs, NJ, 1991), P 150.

*Primary Examiner*—F. L. Evans
*Attorney, Agent, or Firm*—Antonelli, Terry, Stout, & Kraus, LLP

[57] ABSTRACT

A method for sensing the completion of removal of an oxide layer from a semiconductor substrate or a super conductor by a thermal etching in real time. In the method, the time of removal of the oxide layer on the semiconductor substrate or the super conductor can ben accurately sensed. According to the method, when an oxide layer which is different from the semiconductor substrate in the refractive index is being thermally etched at a high temperature, the reflected signals of the laser beams forms a periodicity, and this periodicity is utilized so as to determine the etching rate and the time of the completion of the etching.

4 Claims, 2 Drawing Sheets

METHOD FOR SENSING COMPLETE REMOVAL OF OXIDE LAYER FROM SUBSTRATE BY THERMAL ETCHING WITH REAL TIME

BACKGROUND OF THE INVENTION

1. Field of the Invention

The present invention relates to a method for sensing the completion of removal of an oxide layer from a semiconductor substrate in real time, by thermal etching, in which the time of removal of the oxide layer from the semiconductor substrate can be accurately sensed.

2. Description of the Prior Art

Generally, in manufacturing a semiconductor substrate, the greatest concern of researchers is the quality of the grown heterostructures, and there are many factors considered when determining the quality of the heterostructures.

The factors considered are the growing method, the materials used, the purity of the gas, the quality of the substrate, the thickness of the grown layer, and the capability of adjusting the composition. If any one of the above cited factors is faulty, the quality of the epitaxial layer is aggravated, and this in turn becomes a fatal cause in the deterioration of the performance of the device.

As to the quality of the substrate, the most significant factor is any defect existing on the surface of the substrate. Particularly, in assessing the quality of the tiny epitaxial layer utilizing an nm scale, the existence of defects on the surface of the substrate can lead to a serious adverse result.

Owing to the efforts of many substrate makers, considerably high quality substrates are being produced. Some of the high quality substrates are directly proceeded to a growth procedure without carrying out any pre-treatment. However, in such a process, the cost is high, mass production thereof has not been realized, and it is only in an experimental stage. Further, there is room for the growth of a surface oxide layer at any time.

In most cases, the substrates which are used for the growth process are subjected to pre-treatments, and the treating method includes an etching using chemicals. Recently, in accordance with the improvement of the substrate quality, the chemical treatment is skipped, and instead, a high temperature thermal etching is used prior to carrying out the growth.

Such test piece pre-treating procedure is aimed at removing the oxide layer which exists on the surface of the substrate. If the growth is carried out in a state in which the oxide layer remains, then the oxide layer, the substrate and the epitaxial layer are composed of physically and chemically different materials. Therefore, during the formation of devices, the desired controls cannot be carried out. Further, due to the difference in the lattice structure, three-dimensional defects are produced, with the result being that the quality of the epitaxial layer itself can be aggravated.

The oxide layer of the substrate necessarily exists by being formed at the normal temperature in the atmosphere based on the thermodynamic principle. No matter how superior quality substrate is produced, it is almost impossible for the device maker to store the substrate without causing the formation of an oxide layer until the substrate is subjected to an epitaxial layer growth. Therefore, the substrate should be subjected to removal of the oxide layer by any means.

In the conventional technique, prior to growing the epitaxial layer, foreign materials and the oxide layer are removed from the surface of the substrate by applying a wet etching process using chemicals.

The well-known chemicals which are used for etching the foreign materials and the oxide layer includes a sulfuric acid solution and a chloric acid solution. However, they have to be properly selected in accordance with the substrate kind or type. Further, due to the low level of the purity of the etching solution, the substrate was often contaminated.

However, recently, the quality of the substrates has been markedly improved, and therefore, the etching process processed using chemicals is now almost never used. Instead, the oxide layer is removed immediately before the growth of the epitaxial layer by applying a thermal etching process.

At the present level of the technical development, the apparatuses which attract the most attention as devices for growing an epitaxial layer on semiconductors, super conductors and the like, are the molecular beam epitaxy (to be called "MBE" below) and MOCVD. The MBE method was known to be used as an oxide layer removal method using a thermal etching from its initial development stage.

In the MBE method, the interior of the growing chamber forms a high vacuum of below $10^{-9}$ torr, and therefore, a real time analysis using electron beams is possible. Characteristic of this method, there is the reflection high energy diffraction method (to be called "RHEED" below).

According to this analyzing method, a semiconductor substrate is placed within a growing chamber and is heated to a high temperature. Then electron beams are increasingly irradiated to the substrate, and then, the shape of the reflected beams appears on a detector which is installed at the opposite side. The shape of the electron beams is as follows. That is, at the initial thermal etching stage, the shape of the reflected electron beams is a dispersed reflection. At an intermediate stage, it is an amorphous ring pattern, and at the final stage when the oxide layer almost has been removed, it is a spot pattern.

When the RHEED method is used, the completion of the oxide layer is detected within several scores of seconds. The reason the oxide layer is removed so fast is as follows. That is, the interior of the growing chamber has a high vacuum, and therefore, the removal of the oxide layer occurs so fast owing to the pressure equilibrium.

Meanwhile, as to the MOCVD method, the pressure within the growing chamber is as high as 20 torr. Therefore, it is known that a real time analysis on the phenomenon within the growing chamber is impossible. A thermal etching method is applied, but this is mostly based on experience. Further, the etching conditions are diverse depending on the storing state of the substrate, and therefore, much time loss is caused.

Further, both the MBE method and the MOCVD method have advantages and disadvantages depending on the growing stock and structure. The MOCVD method requires that the etching completion time for the oxide layer be detected with real time, but the real time analysis is impossible in the MOCVD method as described above.

SUMMARY OF THE INVENTION

The present invention is intended to overcome the above described disadvantages of the conventional techniques.

Therefore it is the object of the present invention to provide a method for sensing the completion of removal of an oxide layer from a semiconductor substrate in real time, in which the completion of the removal of a natural oxide layer and an oxide layer grown during the process is accurately detected in real time.

In achieving the above object, the present invention is characterized as follows. By using a real time reflectance measuring device utilizing a laser attached to an MOCVD growing equipment, the completion of the removal of the oxide layer is detected in real time. The real time reflectance measuring device is originally intended to detect the growth rate of an epitaxial layer on the substrate, but the present invention utilizes this device for detecting the etching rate of the oxide layer which is being removed from the substrate. Thus according to the present invention, even in the MOCVD (metal-organic chemical vapor deposition) method, the thermal etching process is sensed prior to the step of growing the epitaxial layer, so that optimum thermal etching conditions can be read.

In the present invention, a semiconductor substrate with an oxide layer formed thereon is placed within a growing chamber. Then an oxide layer etching gas is injected in a state with heat applied to the substrate. At the same time, laser beams are irradiated on the substrate, and the period of the reflectance of the reflected laser beams reflected from the substrate is analyzed, thereby detecting the completion of the etching of oxide layer.

In the present invention, there is used a real time laser reflecting apparatus. At a high temperature, the periodical variation amounts of the signals due to the interferences of the reflected laser signals related to the etching rate of the oxide layer are measured. Thus the relative etching rate is elicited, and the time of the completion of removal of the oxide layer is immediately determined.

In the present invention, when the oxide layer which is different from the substrate in its reflectance is thermally etched, and when the thickness of the oxide layer is reduced, the reflected signals of the laser beams form periodic signals. By utilizing these periods of the signals, the relative etching rate and the time of the completion of the etching are elicited According to the present invention, regardless of the kinds and storing state of the substrate, the time of the completion of the removal of the oxide layer can be measured immediately, and therefore, time can be saved during the growing of an epitaxial layer on a semiconductor substrate.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

The present invention will be described in detail referring to the attached drawings.

The method for detecting the time of completion of removal of the oxide layer from a substrate by a thermal etching with real time according to the present invention will be described referring to FIGS. 1 to 3.

Figure 1:
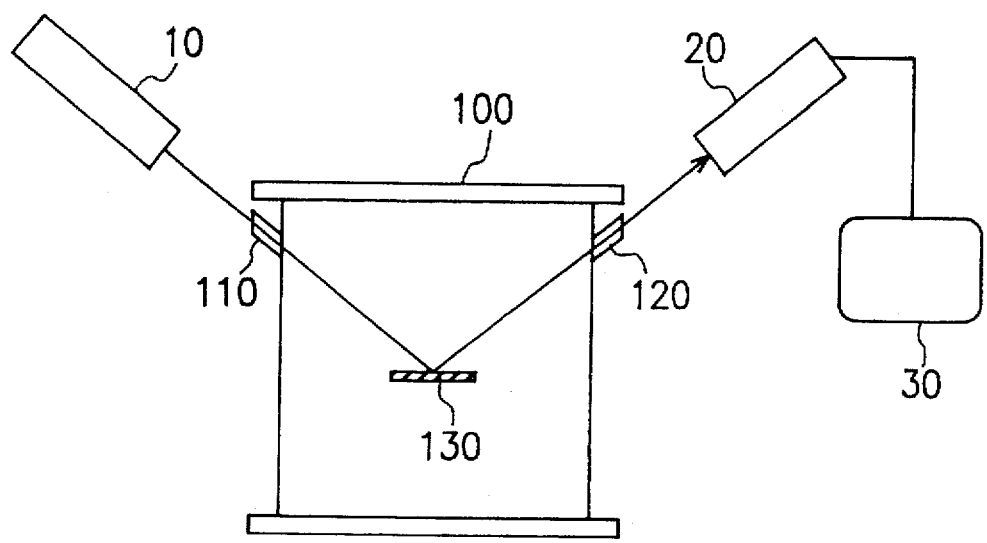
FIG. 1 is a schematic view of the present invention using a real time reflectance measuring device.

FIG. 1 is a schematic view of the usual real time reflectance measuring device installed at the outside of an MOCVD device for showing a preferred embodiment of the present invention.

The reflectance measuring device includes: a laser device 10; a detector 20 for detecting laser beams reflected from the surface of a semiconductor substrate 130, the semiconductor substrate 130 being placed within a growing chamber of an MOCVD device; and a computer 30 for analyzing the reflectance of the laser beams input to the detector 20.

The MOCVD device is provided with glass windows 110 and 120 on opposite side walls, so that laser beams irradiated from a source external of the device would reach the surface of the semiconductor substrate 130 placed within the growing chamber 100.

Figure 2:
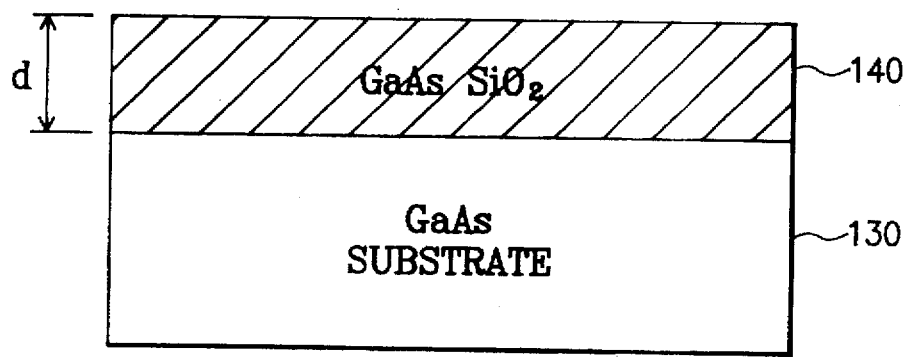
FIG. 2 is a sectional view of a GaAs oxide layer formed on a GaAs substrate.

FIG. 2 is a sectional view of a GaAs substrate 130 on which a natural oxide layer 140 is formed by being exposed to the air. The total thickness is about 0.45 mm, and on the surface of the substrate, the oxide layer 140 is formed by the atmospheric oxygen upon exposing the surface of the substrate to the air. Depending on the storage conditions, the thickness of the oxide layer 140 is usually several scores Å to several hundreds Å($1Å=10^{-7}$ mm).

Generally, an epitaxial layer is formed on the semiconductor substrate by applying the MOCVD method (metal organic chemical vapor deposition method). The real time reflectance measuring device is attached to the MOCVD equipment, so that the thickness and composition of the growing hetero film can be immediately known.

In the embodiment of the present invention, first the semiconductor substrate 130 of FIG. 2 on which the oxide layer 140 has been formed is placed within an epitaxy equipment. For example, the semiconductor substrate is placed within the growing chamber 100 of the MOCVD equipment of FIG. 1. Then a gas for etching the oxide layer is injected into the growing chamber 100, and at the same time, the temperature is raised. Then the laser device 10 of the real time reflectance measuring device irradiates helium-neon laser beams onto the surface of the semiconductor substrate 130. The laser beams which are reflected from the surface of the semiconductor substrate 130 are detected by the optical detector 20. Then the time rate of reflectance which is detected by the optical detector 20 is analyzed by the computer 30, thereby determining the reflectance.

Under this condition, the growing chamber 100 is a space in which a semiconductor hetero film grows. A vacuum of about 20 torr is maintained in the growing chamber 100 in which a heat source is installed for raising the temperature of the atmosphere up to 1000° C.

Not all of the laser beams are reflected from the surface of the oxide layer 140 of the semiconductor substrate 130, but a part of the laser beams is refracted or passed through to reach the semiconductor substrate 130 so as to be reflected from the surface of the semiconductor substrate 130. If there is no phase difference between the reflected wave of the oxide layer 140 and that of the semiconductor substrate, then there occurs a reinforcing interference, and the intensity of the laser beams reflected from the surface of the semiconductor substrate 130. is maximized. When the two reflected laser beams have a phase difference of 90°, an offset interference occurs, with the result that the intensity of the reflected beams is minimized.

However, when the refractive indices of the semiconductor substrate 130 and the oxide layer 140 are different from each other, the above described phenomenon occurs. Actually the substrate and the oxide layer have mutually different optical characteristics in most cases, and therefore, the refraction indices are also different.

Further, when the thickness of the oxide layer 140 is constant, the phase difference is also constant, and therefore the variations of signals cannot be detected. However, in the present invention, the oxide layer is etched by the thermal etching along the time axis, and therefore, the thickness of the oxide layer is varied with the elapsing of time. Therefore, the reflected signals of the laser beams will form a curve along the time axis.

Figure 3:
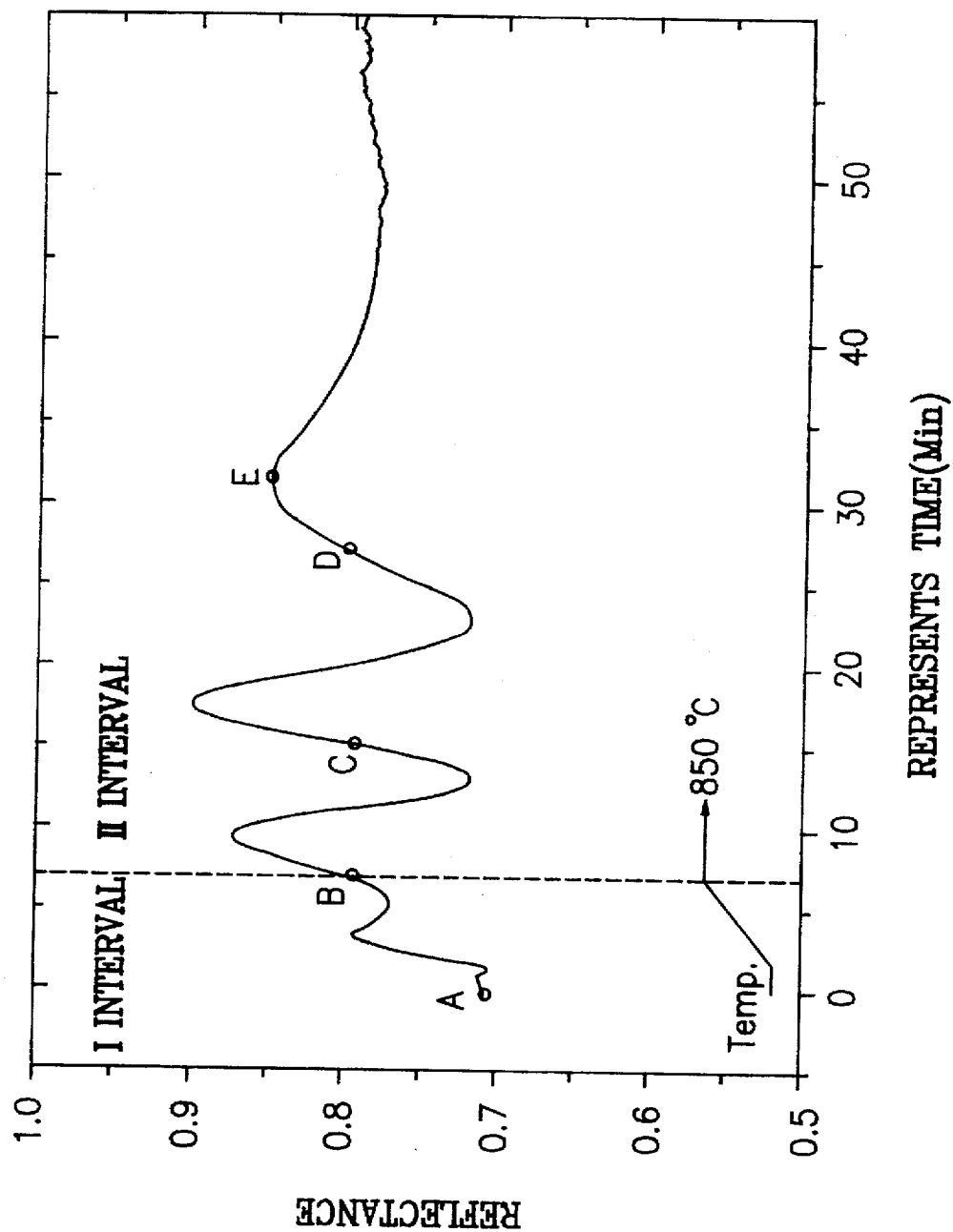
FIG. 3 is a graphical illustration showing the variation of the reflectance of laser beams versus the etching proceeding time for a GaAs oxide layer.

FIG. 3 is a graphical illustration showing the variation of the reflected signals versus time, this graph having been obtained through an experiment. In FIG.3, the lateral axis represents time in which the etching is carried out within the growing chamber. The longitudinal axis represents the relative intensity of the reflectance of the reflected signals as recorded in the detector 20.

The thermal etching was carried out at 850° C. An interval I (from a point A) of FIG. 3 shows signals which have appeared in the procedure of raising the temperature to 850° C. In an interval II (from a point B), the temperature is constantly maintained after reaching 850° C. In interval I, the signals of the thermal etching which appear in accordance with the rise of the temperature are overlapped with the gradually increasing radiant heat, and therefore, an analysis is difficult. However, from interval II, only the reduction of the thickness due to the etching of the oxide layer 140 influences the interference signals, and therefore, it can be analyzed in a simple manner.

That is, the period of the reflected signals is related to the etching rate G as shown in the following formula.

$$Tp = \frac{L}{2 \times n \times G}$$

where Tp is the time corresponding to one period of the reflected signals, L is the wave length of the laser beams, and n is the effective refractive index of the oxide layer 140.

If the above formula is utilized, the etching rate of the oxide layer 140 can be calculated. Seeing that the period corresponding to CD of FIG. 3 is larger than the period of BC, it can be determined that the etching rate is decreased with the elapsing of time.

Meanwhile, the periodicity almost has disappeared at E, and this means that the oxide layer 140 almost completely has been removed. Before the whole oxide layer has been removed, there elapses a considerable time period. In the MBE method, the elapsing time is several scores of seconds, whereas much more time elapses in the MOCVD method. This is determined to be due to the high pressure of the MOCVD growing chamber.

Meanwhile, the same experiment is repeated after lowering the temperature to 700° C. In this experiment, the signal period is increased by 25%, and this means that the etching rate decreases so much.

According to the present invention as described above, there is solved the conventional problem that time loss is very much due to the empirical search of the optimum conditions during the removal of the oxide layer by the thermal etching. In the present invention, the oxide layer removal completion time can be known at once, and therefore, savings of time and money can be realized.

Further, Conventionally, the oxide layer was treated with different chemicals depending on the substrate type or kind during the thermal etching. However, in the present invention, regardless of the kinds of the substrate, the oxide layer is removed by inserting the substrate into a growing chamber.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method for determining the completion of removal of an oxide layer from a semiconductor substrate in real time, said method comprising the steps of:

placing a semiconductor substrate having an oxide layer formed thereon into a growing chamber;

heating said substrate to a predetermined temperature level;

injecting an oxide layer etching gas into said growing chamber;

irradiating laser beams onto said substrate; and analyzing the periods of reflected laser beams so as to sense the completion of etching of said oxide layer.

2. The method as claimed in claim 1, wherein said laser beams are helium-neon laser beams.

3. The method as claimed in claim 1, wherein the periods of reflected signals are calculated based on a formula Tp=L/2nG, where L is a laser wave length, n is an effective refractive index of said oxide layer, and G is an etching rate.

4. The method as claimed in claim 1, wherein said predetermined temperature level is 850° C.

* * * * *